US006975202B1

(12) United States Patent
Rodriguez et al.

(10) Patent No.: US 6,975,202 B1
(45) Date of Patent: Dec. 13, 2005

(54) ELECTRONIC KEY SYSTEM, APPARATUS AND METHOD

(75) Inventors: Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 09/717,521

(22) Filed: Nov. 21, 2000

(51) Int. Cl.[7] .......... G05B 19/00
(52) U.S. Cl. .......... 340/5.25; 340/5.53; 340/5.61; 340/5.64; 340/5.67; 340/5.52; 340/10.1; 340/10.4; 340/5.23; 340/5.2; 340/825.69; 340/825.72; 340/542
(58) Field of Search .......... 340/5.25, 5.53, 340/5.61, 5.64, 5.67, 542, 552, 10.1, 10.24, 340/5.23, 5.2

(56) References Cited

U.S. PATENT DOCUMENTS

| | | | | |
|---|---|---|---|---|
| 4,947,163 A * | 8/1990 | Henderson et al. | 340/825.31 |
| 5,161,118 A | 11/1992 | Matsuda et al. | 364/744 |
| 5,691,711 A | 11/1997 | Jorgensen | 340/825.31 |
| 5,745,044 A * | 4/1998 | Hyatt, Jr. et al. | 340/825.31 |
| 5,774,059 A * | 6/1998 | Henry et al. | 340/825.31 |
| 5,815,557 A * | 9/1998 | Larson | 379/102.06 |
| 5,838,251 A * | 11/1998 | Brinkmeyer et al. | 340/825.31 |
| 5,936,544 A * | 8/1999 | Gonzales et al. | 340/825.34 |
| 5,974,367 A | 10/1999 | Bianco | 70/278.2 |
| 6,049,289 A * | 4/2000 | Waggamon et al. | 340/5.23 |
| 6,097,306 A | 8/2000 | Leon et al. | 340/825.31 |
| 6,166,650 A * | 12/2000 | Bruwer | 340/5.26 |
| 6,300,873 B1 * | 10/2001 | Kucharczyk et al. | 340/568.1 |
| 6,570,488 B2 * | 5/2003 | Kucharczyk et al. | 340/5.2 |

* cited by examiner

*Primary Examiner*—Michael Horabik
*Assistant Examiner*—Vernal Brown
(74) *Attorney, Agent, or Firm*—Duke W. Yee; David A. Mims, Jr.; Wayne P. Bailey

(57) ABSTRACT

A system, apparatus and method for using an electronic key to open electronic locking devices is provided. With the system, apparatus and method, a key code is sent to a user's wireless communication device and is later used to open a corresponding locking device. The key code is generated by a key supplier based on a master key obtained from a master key supplier, e.g. an electronic lock manufacturer. The key code may include a master key portion, a secondary key portion, an activation/expiration portion, a wireless device identifier portion, a time of issue portion, and a time of last use portion.

54 Claims, 4 Drawing Sheets

ELECTRONIC KEY SYSTEM, APPARATUS AND METHOD

BACKGROUND OF THE INVENTION

1. Technical Field

The present invention is directed to an electronic key system apparatus and method. More specifically, the present invention is directed to a system, apparatus and method in which an electronic key is transmitted to a wireless communication device for use in unlocking an electronic lock.

2. Description of Related Art

Known locking systems typically include a mechanical lock requiring a physical key that is inserted into the lock in order to open the lock for access to the contents of the locked object. These physical keys are inconvenient at best since they are prone to being misplaced and create security issues including possible duplication of the physical key and "picking" of the lock. If a physical key is lost, it may be very expensive to obtain a replacement key, and in many cases, replacement keys may not be obtainable. In such instances, the entire lock must be replaced.

In an effort to overcome the drawbacks of physical keys, electronic keycards, punch cards and smart cards have been devised to take the place of physical keys. With an electronic keycard, a magnetic strip on the keycard is encoded by a keycard supplier such that the keycard may be used to open a lock having a magnetic stripe reader. Punch cards make use of a pattern of holes in a card which are used with an optical reader or physical pins to identify a pattern used to open a lock. Smart cards include a built-in microprocessor and memory used for identification. When inserted into a reader, the smart card transfers data to and from a central computer. It is more secure than a magnetic stripe card and can be programmed to self-destruct if the wrong passcode is entered too many times.

Each of these keycards and punch cards reduce the cost of replacement of misplaced keys since keycards and punch cards are generally low cost items. In addition, since a substitute keycard or punch card may be encoded or punched in the same way as the original keycard, locks generally need not be replaced. Smart cards, while much more secure and are relatively easy to program, are expensive to reproduce and replace.

Thus, the problems of misplacement and security are not solved by the use of keycards and punch cards. Similarly, the problems of misplacement and replacement expense are not solved by the use of smart cards. Just as with physical keys, keycards, punch cards and smart cards may also be lost or misplaced. While the cost of replacement of keycards and punch cards may be smaller than the use of physical keys, there is still a cost involved that keycard and punch card suppliers would like to avoid. Further, the security problems of unauthorized keycard or punch card duplication are not solved by current keycard and punch card systems. Thus, it would be beneficial to have a system, apparatus and method for using an electronic key that overcomes the security and misplacement problems of known systems.

SUMMARY OF THE INVENTION

The present invention provides a system, apparatus and method for using an electronic key to open electronic locking devices. With the system, apparatus and method of the present invention, a key code is sent to a user's wireless communication device and is later used to operate a corresponding locking device. The key code is generated by a key supplier based on a master key obtained from a master key supplier, e.g. an electronic lock manufacturer. The key code may include a master key portion, a secondary key portion, an activation/expiration portion, a wireless device identifier portion, a data of issue portion, and a last use portion.

When a user of the wireless device wishes to unlock (or lock) an electronic locking device, the user initiates a transmission of the electronic key. An electronic locking device receives the electronic key transmission and authenticates the electronic key. If the key is authenticated, the electronic locking device is operated and the user is allowed access to the contents of the object, for example. If the key is not authenticated, the electronic locking device does not operate.

In addition, if the key is not authenticated, various functions may be performed to ensure the security of the locked object and the system as a whole. For example, the electronic locking device may be "frozen" such that no other keys may be used to unlock the electronic locking device until a master key code is used. A report of the attempt to use an invalid key code may be generated at a central location, such as at the key supplier. If multiple attempts to unlock the electronic locking device are made within a predetermined period of time, the electronic locking device may be "frozen" in order to thwart persons attempting to "pick" the electronic lock, for example.

The electronic key system, apparatus and method of the present invention avoids the problems associated with misplacing a physical key because the key code of the present invention exists only as data in a storage device. If the data is lost, it may be reproduced at practically zero cost. Furthermore, the use of the electronic key system of the present invention provides extra security because unauthorized duplication of the key code is very impractical.

Moreover, the key code of the present invention may be provided to a customer via a network at a time remote from the time of actual use of the key code. For example, the key code may be provided to the customer via electronic mail. The key code may be stored in a key code storage of a wireless communication device and later used by the customer to operate a locking mechanism. In this way, the customer may proceed directly to the locked object rather than having to interact with business personnel to obtain the key code.

Other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The present invention provides a mechanism by which electronic key codes may be used, in conjunction with a wireless communication device, to operate electronic locking devices to obtain or prevent access to contents of a locked object. Throughout this disclosure, the terms “key” and “key code” will be used interchangeably to refer to a data representation of a code that may be used as an electronic means for authenticating a user’s access to the locked object.

Figure 1:
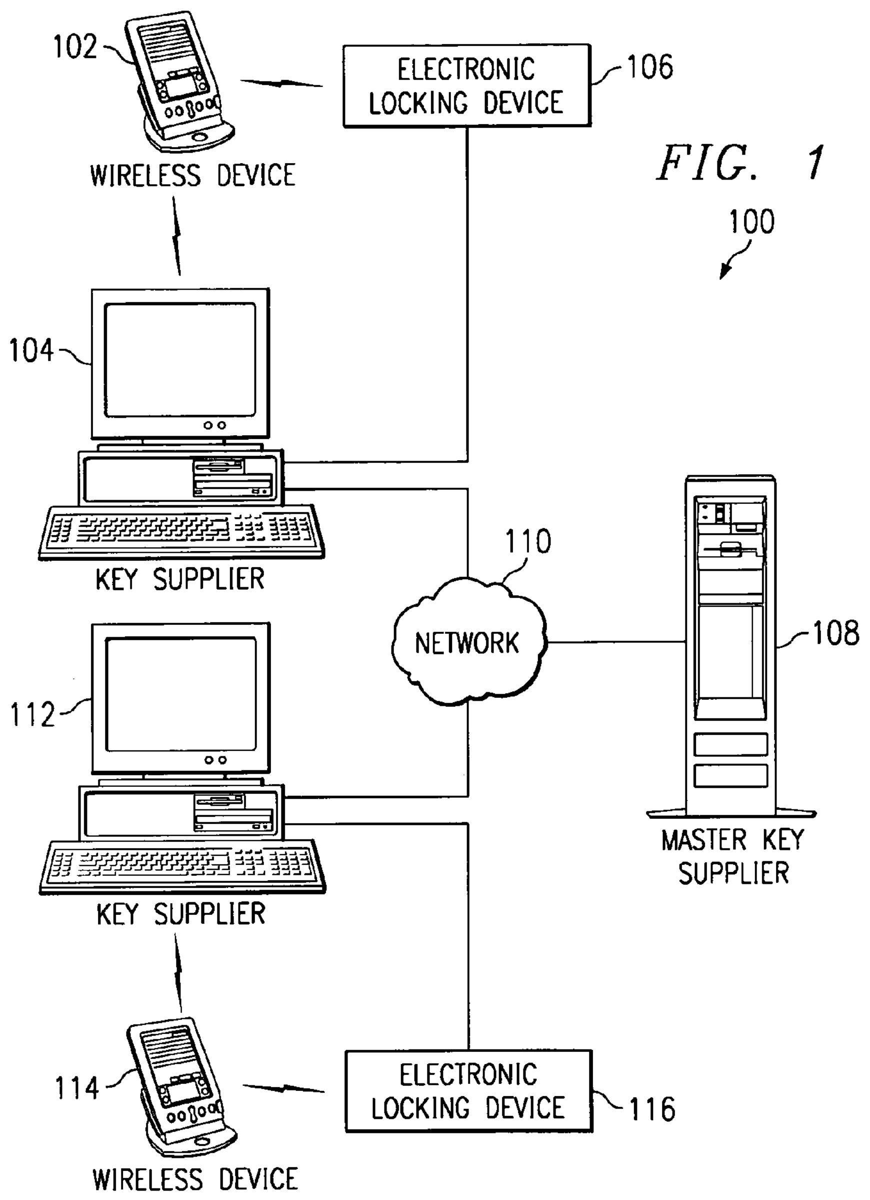
FIG. 1 is a diagram illustrating a distributed data processing system according to the present invention.

With reference now to the figures, and in particular with reference to FIG. 1, a distributed data processing system 100 is shown. The distributed data processing system 100 includes wireless communication devices 102 and 114, key suppliers 104 and 112, electronic locking devices 106 and 116, network 110 and master key supplier 108. The network 110, master key supplier 108, key suppliers 104 and 112, and electronic locking devices 106 and 116 are in communication with one another via communication links. These communication links may be wired communication links or wireless communication links and may include telephone line connections, cable connections, mobile communication links, satellite communication links, infrared communication links, and the like.

The key suppliers 104 and 112 obtain master key information from the master key supplier 108 via the network 110. The key suppliers 104 and 112 are computing devices capable of sending and receiving data transmissions. The key suppliers 104 and 112 may be, for example, stand alone computing devices, personal computers, servers, network computers, Bluetooth™ enabled devices, or the like.

The master key supplier 108 is a supplier of master key information to be used by key suppliers when generating and supplying secondary key codes for use with electronic locking devices. The master key supplier 108 may be any supplier of key codes which may be used by key suppliers to generate secondary key codes. The master key supplier 108 may distribute master key codes in any number of different ways including sending the key codes by electronic means, such as over a network or on a recordable medium, or by non-electronic means, such as through a mail system. In the particular embodiments described herein, it will be assumed that the master key supplier 108 is a master key server that is accessible via the network 110.

The electronic locking devices are preprogrammed before use to require a particular master key identification or master key code before the electronic locking device may be programmed with a secondary key code. In addition, the secondary key code may include a portion of the master key code or the master key identification as part of the secondary key code used to unlock the electronic locking device.

Alternatively, the electronic locking devices may have a list of one or more valid secondary codes preprogrammed into a memory of the electronic locking devices before the electronic locking devices are placed into use. These preprogrammed secondary codes may be provided to a key supplier by a master key supplier. Thus, when a key code is provided to an electronic locking device, the electronic locking device may compare the received key code to the list of stored secondary codes to determine if a valid key code has been received. For purposes of the following description of the preferred embodiments, however, it will be assumed that the electronic locking devices are not preprogrammed with the secondary codes and the secondary codes must be supplied to the electronic locking devices by the key suppliers, as will be described in greater detail hereafter.

The master key supplier 108 may be, for example, a central repository of master key codes for the electronic locking devices. The master key supplier 108 may be operated by a supplier of electronic locking devices, for example. When a key supplier needs to obtain a master key from the master key supplier 108, the key supplier sends a request to the master key supplier 108 via the network 110. The network 110 may be any type of network capable of transmitting data messages from one computing device to another. For example, the network 110 may be a local area network (LAN), wide area network (WAN), digital mobile network, an intranet, the Internet, or the like. In a preferred embodiment of the present invention, the network 110 is the Internet.

The key supplier may send a request to the master key supplier 108 by sending a data message to an IP address of the master key supplier 108, for example. The data message may identify, for example, a customer identifier of the key supplier, a product code of the electronic locking devices, or the like, as well as any security information, such as certificate information, password information, or the like, which can be used to authenticate the key supplier as an authorized party to receive the master key. Based on the receipt of the request message from the key supplier, and subsequent authentication of the key supplier, the master key supplier 108 sends a master key for use with the identified electronic locking devices.

The electronic locking devices 106 and 116 may be configured to receive key information from key suppliers 104 and 112, respectively. The key information may include, for example, a valid secondary key code to be used for unlocking (or locking) the electronic locking device, activation/expiration information for the key code, device identification information of the wireless communication device, master key information, and the like. The electronic locking devices 106 and 116 may receive the key information from the key suppliers 104 and 112, respectively, by way of wired or wireless communication links, or may be preprogrammed with the key information as described above.

For example, the key suppliers 104 and 112 may transmit the key information by identifying a network address of an electronic locking device in a local area network and sending the key code information to that address. Alternatively, the key suppliers 104 and 112 may broadcast the key code information along with an electronic locking device identifier such that only the electronic locking device corresponding to that identifier will make use of the associated key information. Such broadcast transmissions may be encrypted for use only by the electronic locking devices. Other mechanisms by which the key information may be transmitted to the electronic locking devices may be used without departing from the spirit and scope of the present invention.

In addition to supplying the key code information to the electronic locking devices 106 and 116, the key suppliers 104 and 112 supply the key code information to the wireless communication devices 102 and 114. The wireless communication devices 102 and 114 may be any type of wireless communication device capable of sending and receiving data transmissions and storing key code information. The wireless communication devices 102 and 114 may be, for example, personal digital assistants (PDAs), two way paging devices, mobile telephone devices, wireless transmitters, handheld computers, laptop computers, Bluetooth™ enabled devices, and the like. In a preferred embodiment of the present invention, the wireless communication devices 102 and 114 are personal digital assistants capable of wireless communication.

The wireless communication devices 102 and 114 may obtain the key code information from the key suppliers 104 and 112 via a wired or wireless communication link directly with the key suppliers 104 and 112 as shown. Alternatively, the wireless communication devices 102 and 114 may obtain the key code information via the network 110. For example, the key code information may be sent to the wireless communication devices 102 and 114 using data packet transmission through the network 110 to a server associated with the wireless communication devices. The wireless communication devices may then download the key code information from this server for later use in operating the electronic locking devices. As an example, the key code information may be forwarded in this manner as an attachment to an electronic mail message which is downloaded to the wireless communication device.

As an example of the operation of the system according to the present invention, the key supplier 104 first sends a master key request to the master key supplier 108 via the network 110. The master key supplier 108 authenticates the key supplier 104 and replies to the request with the master key for the electronic locking device 108, if the key supplier 104 is authenticated. The key supplier 104 may then use the master key to generate secondary keys for use by users of wireless communication devices.

Thereafter, a user of a wireless communication device 102 requests access to the contents of an object locked by the electronic locking device 106. The key supplier 104 determines whether or not to allow access to the user and if so, generates a secondary key using the master key. The secondary key may include one or more of, for example, a master key portion, a secondary key portion, a wireless communication device identification portion, an activation/expiration portion, and the like.

The secondary key is then transmitted to the electronic locking device 106. In addition, the master key may also be transmitted to the electronic locking device in order to authenticate the key supplier as an authorized party to reprogram the electronic locking device 106. Once the key supplier 104 is authenticated, the electronic locking device is reprogrammed to operate when the secondary key is transmitted to it by an authorized user of the secondary key. The electronic locking device 106 may then respond to the key supplier 104 with a confirmation that the electronic locking device 106 has been successfully reprogrammed. Alternatively, if authentication fails or if the reprogramming fails, an error message may be sent to the key supplier 104.

The key supplier 104 also sends the secondary key to the wireless communication device 102. As mentioned above, this may be done by a direct wireless communication connection, a direct wired connection, such as through a connection from a port in the key supplier 104 to a port in the wireless communication device 102, or via the network 110, for example. The sending of the secondary key to the wireless communication device 102 may be performed once confirmation of the reprogramming of the electronic locking device is obtained or at some time distant from the reprogramming of the electronic locking device. For example, if the secondary key code is to be valid at some distant time after receipt of the request from the user of the wireless communication device, the secondary key may be sent to the wireless communication device in response to receiving the request whereas the reprogramming of the electronic locking device may be performed at a time closer to the time at which the secondary key code is to be valid.

Thereafter, when a user of the wireless communication device 102 wishes to operate the electronic locking device 106, the wireless communication device 102 transmits the secondary key code to the electronic locking device 106. The electronic locking device 106 authenticates the secondary key code and, if the secondary key code is authentic, unlocks (or locks) the electronic locking device 106. If the secondary key code is not authentic, the electronic locking device 106 may send an error message to the wireless communication device 102.

Authentication of the secondary key code may require various levels of authentication. For example, the secondary key code may be authenticated based on the code itself. In addition, the authentication may require that the code be a valid code as well as the code not having become expired, as determined from activation/expiration information stored in the secondary code itself, the electronic locking device, or the like. In addition, the authentication may require that the wireless communication device 102 send a device identifier along with the secondary code, the device identifier having to match a device identifier stored in the electronic locking device 106. Other authentication measures may be used in addition to, or in replacement of, those described above without departing from the spirit and scope of the present invention.

In addition to the above, if an attempt to operate an electronic locking device using a particular secondary key code is unsuccessful, the electronic locking device 106 may report the attempted operation to the key supplier 104. In more drastic cases, such as when repeated attempts are made within a short period of time, or when obvious attempts to "pick" the electronic locking device are made, the electronic locking device 106 may cause itself to enter a "slow down mode" or a "frozen" state.

The "slow down mode" causes the electronic locking device 106 to only accept transmitted codes at predetermined intervals. For example, the "slow down mode" may cause the electronic locking device 106 to accept key codes only every five minutes. The purpose of this mode is to deter "picking" of the electronic locking device 106 by causing the lock pick attempts to take a very long time, thus increasing the probability of detection. Typically, with computerized devices, a person attempting to pick the electronic locking device 106 may make a number of key code attempts within a few seconds. The "slow down mode" of the present invention eliminates this advantage. Furthermore, when accompanied with a report to the key supplier 104, detection and capture of the person attempting to pick the electronic lock is much more likely.

The "frozen" state is used to completely eliminate any possibility of picking the electronic locking device 106 by causing the electronic locking device not to function. With the "frozen" state of the present invention, the electronic locking device 106 may not be operated, even by an authentic secondary key, until the master key code is again sent to it by the key supplier with a command to exit the "frozen" state.

Moreover, the electronic locking device may send a message back to the wireless communication device instructing the wireless communication device to destroy the secondary key code that it attempted to use. When the wireless communication device receives this message, the wireless communication device will then delete the secondary key code from the storage in the wireless communication device or otherwise may make the secondary key code unavailable for use.

As mentioned above, the electronic locking device 106 may be equipped with a processor and transmitter allowing the electronic locking device 106 to report unsuccessful attempts at operating the electronic locking device 106. Such reporting may be performed in response to the detection of, for example, more than a threshold number of unsuccessful attempts to operate the electronic locking device 106 within a predetermined period of time.

In a further embodiment, the key supplier 104, for example, may periodically poll electronic locking devices 106 to determine their status, i.e. open, closed, in a "slow down mode" or in a "frozen" mode. Additionally, the key supplier 104 may periodically, or at the instruction of an operator, poll the electronic locking devices 106 for information pertaining to the last time the electronic locking device 106 was operated, the key code last used to operate the electronic locking device, the device identifier of the wireless communication device used to operate the electronic locking device last, and the like. In order to maintain this information, the electronic locking device needs to be equipped with a memory or storage device capable of storing this information and rewriting the information as the electronic locking device is subsequently operated.

Once the key supplier has established the status of the electronic locking device, if the status of an electronic locking device is other than it should be, the key supplier may issue commands to the electronic locking device to change its status. For example, the key supplier may issue a command to change an electronic locking device's status from unlocked to locked, from "slow down mode" to a normal operation status, from a "frozen" mode to a normal operation status, and the like. The issuance of commands may require the key supplier to supply the master key, a valid secondary key, or other identifier for authenticating the source of the issued commands.

The above described embodiments assume a fairly intelligent electronic locking device 106 that is capable of performing authentication procedures as well as sending of error messages and reporting of failed attempts to the key supplier. However, such intelligent electronic locking devices are not necessary to the functioning of the present invention.

In an alternative embodiment, the electronic locking device 106 may be passive in nature. In such an embodiment, the electronic locking device 106 need not be programmed with the authentic secondary key code. That is, the electronic locking device 106 may operate as an interface through which a secondary key code transmitted by the wireless communication device 102 is routed to the key supplier 104.

Thus, for example, when the electronic locking device 106 receives a data message transmission from the wireless communication device 102, the data message is forwarded by the electronic locking device 106 to the key supplier 104 via a communication link. The key supplier 104 then performs the necessary authentication operations and transmits a message to the electronic locking device 106 to operate only when an authentic secondary key is supplied by the wireless communication device 102. Alternatively, if a non-authentic secondary key is transmitted, the key supplier 104 may transmit a message to the electronic locking device 106 to place it into a "frozen" state, as described above.

In this embodiment, the authentication procedure may require a key code table to be maintained in the key supplier 104 such that each entry in the key code table identifies a secondary key associated with a particular electronic locking device. Other information, including activation/expiration information for the secondary key may also be stored in the key code table. Thus, when a secondary key is forwarded to the key supplier 104 by an electronic locking device 106, the key supplier 104 may compare an electronic locking device identifier and the secondary key to those stored in the key code table to verify whether or not the received secondary key is the currently valid secondary key. Other mechanisms for verification may be used without departing from the spirit and scope of the present invention.

The use of key codes in the manner described above with regard to the present invention overcomes many of the drawbacks associated with the use of physical keys and keycards. For example, the key codes of the present invention are stored only as data in a wireless communication device. Thus, if the key code is lost, it can be easily reproduced by the key supplier at negligible cost. Security is maintained by requiring the master key for reprogramming of the valid secondary key for an electronic locking device, allowing for activation/expiration of the secondary key, requiring both a secondary key as well as a valid device identifier before operating an electronic locking device, providing a possibility of placing the electronic locking device in a "frozen" state until a master key is used to reset the electronic locking device, as well as many other security measures.

It is contemplated that the present invention may be used in service industries in which the handing out of keys is performed on a regular basis, although the invention is not limited to such an application. For example, the present invention is exceptionally well suited for such establishments as hotels, motels, rental car establishments, locker rental establishments, personal storage area establishments, and the like.

In such applications of the present invention, the wireless communication device 102 or 114 may be a device owned by the user of the wireless communication device or may be a device supplied to the user by the key supplier 104. Thus, with the present invention, the hotel, motel, rental car establishments, etc. may save the cost of creating keys or keycards for customers by making use of devices already owned by the customers. For example, if a customer wishes to rent a hotel room for the night, rather than providing a physical key or keycard that may get lost, and in the case of keycards requires reprogramming of the magnetic strip on the keycard, the hotel operator may simply program the customer's PDA or mobile telephone to operate as the transmitter of the key code to provide access to the hotel room.

In addition, the trend today in the rental car business is to minimize the amount of interaction between customers and an employees of the rental car establishment in order to provide a more customer friendly experience. Such services as Hertz Gold™ customer program, and the like, allow a customer to go directly to their rental car without having to go through paperwork at the rental desk. To date, no such service is available for hotel, motel, locker rental, storage space rental, and other service businesses.

However, with the increased customer friendliness of this kind of service, there are increased security issues. For example, there is a significantly increased possibility of theft of vehicles because this service requires that the rental car have the physical keys in the car ignition for immediate use by the customer. Furthermore, the supplier, e.g. Hertz, must still provide a physical key that is subject to loss, unauthorized duplication, and the like.

The present invention provides a mechanism that facilitates minimization of customer interaction with employees in all service businesses while maintaining a high level of security. With the present invention, key codes may be provided with an activation/expiration schedule as to when they are valid. In addition, as described above, secondary key codes may be provided to the wireless communication device at a time remote from the actual use of the secondary key code or the activation/expiration scheduled times at which the secondary key codes will be valid. In addition, should the key code be lost or misplaced, the key code may be easily reproduced and provided to the customer without requiring the customer to be physically present at the key supplier. In other words, the key code may be retransmitted to the customer from a remote location.

For example, the secondary key code may be provided to the wireless communication device as an attachment to an electronic mail message sent to the wireless communication device. The secondary key code may then be stored for later use when the user of the wireless communication device arrives at the hotel, motel, rental car establishment, etc. In this way, the user of the wireless communication device is provided access to the locked object without requiring the user to go to a rental desk, or the like, and fill out paperwork. In addition, the present invention does not require physical keys to be placed in the lock of the object for use by the customer when the customer arrives. As a result, the likelihood that an unauthorized user will access the object before the authorized user is reduced.

Moreover, with the present invention, if a hotel customer must be reassigned to another room, the key code may be used with a subsequent electronic locking device on the new room. That is, if the customer is reassigned, rather than having to reprogram a keycard, smart card, or reissue a punch card, the customer may use the same key code issued to him/her with the new room. In this case, the key supplier need only reprogram the electronic locking device of the new room to accept the key code transmitted to the customer.

In addition, the present invention allows a key supplier to invalidate secondary keys when a security breach has been determined to exist. For example, if an employee of the key supplier, who has a valid key code for accessing locked objects, is terminated, the key supplier may invalidate the employee's key code immediately using the master key code. Since the key code is not a physically reproducible item, it is unlikely that the employee will have a duplicate of the key code and even if he/she did, it would not be useable since the employee's key code has been invalidated.

In addition, a record of valid key codes may be maintained in the key supplier and a record of the key codes used to access a locked object may also be maintained in the key supplier. Should a breach of security be identified, the last key code used to access the locked object may be used to identify the most probable source of the breach of security. In this way, key suppliers may be notified of possible sources of security breaches in order to take corrective action. Other possible uses of the present invention will become apparent to those of ordinary skill in the art in view of the above disclosure and are intended to be within the scope of the present disclosure.

Figure 2:
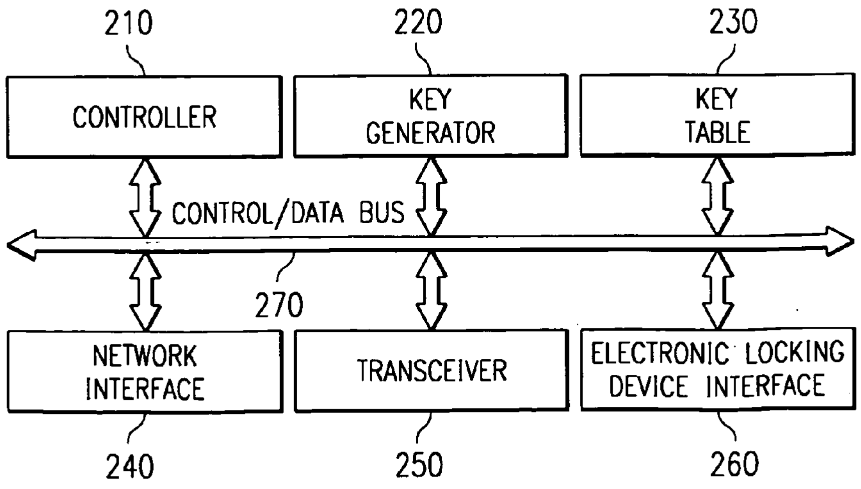
FIG. 2 is an exemplary block diagram of a portion of a key supplier according to the present invention.

FIG. 2 is an exemplary block diagram of a portion of a key supplier according to the present invention. As shown in FIG. 2, the key supplier includes a controller 210, a key generator 220, a key table 230, a network interface 240, a transceiver 250 and an electronic locking device interface 260. The elements 210–260 are coupled together via the control/data bus 270. Although a bus architecture is shown in FIG. 2, the present invention may make use of any architecture facilitating the communication of data among the elements 210–260 as necessary.

The controller 210 controls the operation of the key supplier and oversees the operation of elements 220–260. The controller 210 is used to request a master key, store the master key in memory (not shown), and instruct the elements 220–260 to operate and perform various functions. The controller 210 may operate based on software instructions stored in one or more programs in a main memory (not shown). Alternatively, some or all of the instructions implemented by the controller 210 may be hardwired into the controller 210 as hardware circuitry.

The key generator 220 is used to generate secondary keys based on the master key and information supplied to the key generator 220 by the controller 210. For example, the key generator 220 may be supplied with wireless communication device identifiers, activation/expiration information, and the like, which may be used to generate a secondary key code for use with an electronic locking device.

The key generator 220 may use any method to generate the secondary key code. For example, the key generator 220 may use a random number generator, a key code algorithm, one of a plurality of key code generation algorithms chosen in a random or pseudo-random manner, or the like. In short, any method of generating a unique secondary key code based upon the master key code may be used without departing from the spirit and scope of the present invention.

The key table 230 is used to store information pertaining to electronic locking devices, wireless communication device identifiers, secondary key codes, activation/expiration information, and the like. In addition, the key table 230 may store history information identifying the secondary key codes used to operate a particular electronic locking device over a previous time interval. The key table 230 may be updated by the controller 210 and/or key generator 220 as conditions with various electronic locking devices change.

The key table 230 may be used by the controller 210 when performing secondary key code authentication as described above. In addition, the key table 230 may be used to identify wireless communication devices and/or secondary key codes used to operate an electronic locking device. Other uses of the key table 230 may be made without departing from the spirit and scope of the present invention.

The network interface 240 is used to communicate with a master key supplier via a network, such as network 110. The controller 210 sends requests to the master key supplier to obtain master keys for use with one or more electronic locking devices. In the event that a master key is lost, such as due to writing over the master key in memory or the like, a request for retransmission of the master key may also be sent to the master key supplier via the network interface 240. The master key supplier sends the master key information to the controller 210 via the network interface 240.

The transceiver 250 is used to communicate with a wireless communication device. The transceiver 250 receives requests from a wireless communication device for secondary key codes and provides secondary key codes to the wireless communication device. As mentioned above, rather than a transceiver 250, a cable connected to a port in the key supplier may be used to exchange messages with a wireless communication device.

The electronic locking device interface 260 is used to communicate with an electronic locking device. The electronic locking device interface 260 may receive messages from the electronic locking device and send messages to the electronic locking device in any of a number of different ways. For example, as mentioned above, the electronic locking device interface 260 may make use of wired or wireless connections to the electronic locking devices including infrared connections, radio communication connections, mobile communication connections, telephone line connections, cable connections, the network 110, and the like.

Figure 3:
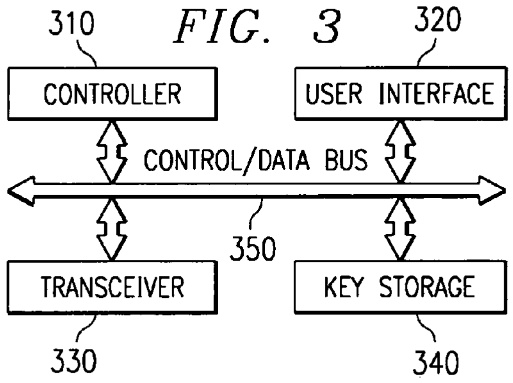
FIG. 3 is an exemplary block diagram of a portion of a wireless communication device according to the present invention.

FIG. 3 is an exemplary block diagram illustrating a portion of a wireless communication device in accordance with the present invention. As shown in FIG. 3, the wireless communication device includes a controller 310, a user interface 320, a transceiver 330, and a key storage 340. These elements are coupled to one another via the control/data bus 350. Although a bus architecture is shown in FIG. 3, the present invention may make use of any architecture facilitating the communication of data among the elements 310–340 as necessary.

As with the key supplier, the controller 310 controls the operation of the wireless communication device. The user interface 320 is used to receive input from a user as well as display or audibly output information to the user. The transceiver 330 is used to receive and transmit messages. The key storage 340 is used to store secondary key information for use with an electronic locking device.

The controller 310 may operate based on one or more programs stored in a memory (not shown) of the wireless communication device. Such programs provide instructions for operating the wireless communication device so that a user interface is provided to the user for accessing and operating an electronic locking device. These programs may provide an interface through which a user may request a secondary key code, transmit a secondary key code to an electronic locking device, and receive response messages and output these messages to the user indicating the results of an attempt to operate an electronic locking device. In addition, these programs may provide other information of interest to the user including activation/expiration information of the secondary key code, and the like.

Figure 4:
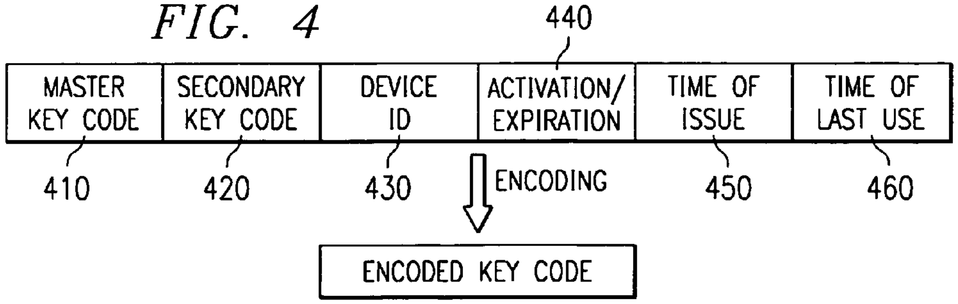
FIG. 4 is an exemplary block diagram illustrating portions of a key code in accordance with the present invention.

FIG. 4 is an exemplary block diagram illustrating portions of a secondary key code in accordance with the present invention. As shown in FIG. 4, the secondary key code may include a master key code portion 410, a secondary key code portion 420, a device identifier portion 430, an activation/expiration information portion 440, a time of issue portion 450, and a time of last use portion 460. While the particular secondary key code shown in FIG. 4 includes all six of these sections, the secondary key codes in accordance with the present invention may have one or more of these portions without departing from the spirit and scope of the present invention. In any case, the secondary key code must include the portion 420. Furthermore, the portions of the key code may be in any order and are not limited to the order depicted in FIG. 4.

The master key code portion 410 may be used as a mechanism for authenticating the secondary key code. The master key code portion 410 may include all of the master key code, may include only a portion of the master key code, or may include a value associated with the master key code. The master key code portion 410 is essentially used as a mechanism for verifying that the sender of the secondary key code obtained the secondary key code from an authorized key supplier.

The secondary key code portion 420 is the key code that allows the particular wireless communication device user to access and operate the electronic locking device. The secondary key code portion 420 is the portion of the secondary key code that is generated by the key generator 220 of the key supplier.

The device identifier portion 430 identifies the authorized wireless communication device for sending the secondary key code. The device identifier portion 430 may be used by either the electronic locking device or the key supplier to authenticate that the wireless communication device that sent the secondary key code was the wireless communication device that originally requested the secondary key code. For example, when the secondary key code is transmitted by the wireless communication device, the wireless communication device may also transmit a device identifier that is then compared to the device identifier encoded in the secondary key code. Only if the two identifiers match will the electronic locking device be operated. In this way, third parties that may have copied the secondary key code from the authorized wireless communication device will not be able to operate the electronic locking device.

The activation/expiration portion 440 identifies a period of time in which the secondary key code is valid. This activation/expiration portion 440 may be compared to a current time, date, and the like, by an electronic locking device or key supplier. Only if the current time is within the period of time in which the secondary key code is valid will the electronic locking device be operated. This portion may not be included in the secondary key code if the activation/expiration information is stored in the electronic locking device or the key supplier for purposes of authentication or if there is no activation/expiration information.

The time of issue portion 450 is used to identify when the key code was issued by the key supplier. This information may be used for authentication purposes or when identifying a person that last accessed an electronic locking device. For example, if secondary key codes are reused, the time of issue information and device ID may be used as a means for identifying a unique key code.

The time of last use portion 460 will be null when the key code is first generated. However, as the key code is used with an electronic locking device, this portion may be updated to identify the date/time of last use of the key code. This information may be used to perform a reverse look-up to identify a wireless device that last used the key code. For example, the key supplier may transmit a query signal to all wireless communication devices that have received key codes within a previous period of time. The wireless communication devices may then respond with their key codes identifying the last time the key code was used and their device identifiers. In this way, a key supplier may determine whether a key code has been duplicated without authorization. Furthermore, a key supplier may identify a most probable person to have accessed a locked object.

As shown in FIG. 4, the key code may be encoded such that the various portions of the key code are not discernible without decrypting the key code. Thus, the key supplier and electronic locking device must be provided with a mechanism for decrypting the encrypted key code. Once the key code is decrypted, the various portions of the key code may be identified and authentication can be performed.

Figure 5A:
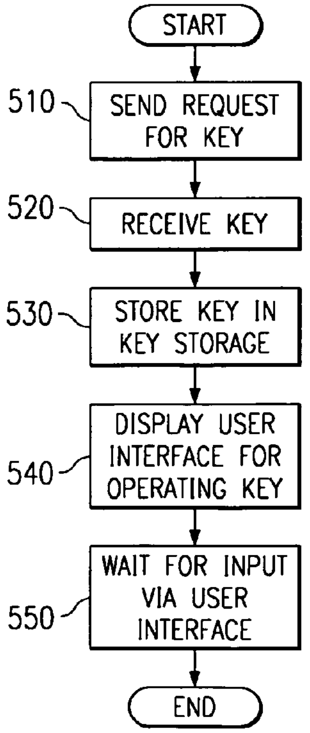
FIG. 5A is a flowchart outlining an exemplary operation of a wireless communication device when obtaining an electronic key code from a key supplier in accordance with the present invention.

FIG. 5A is a flowchart outlining an exemplary operation of a wireless communication device when requesting a secondary key from a key supplier. The operation starts with a request for the secondary key being sent (step 510). Thereafter, the secondary key is received (step 520) and stored in the key memory (step 530). The user interface for using the stored key is then displayed on the wireless communication device (step 540). The wireless communication device then waits for input via the user interface that attempts to make use of the stored key (step 550).

Figure 5B:
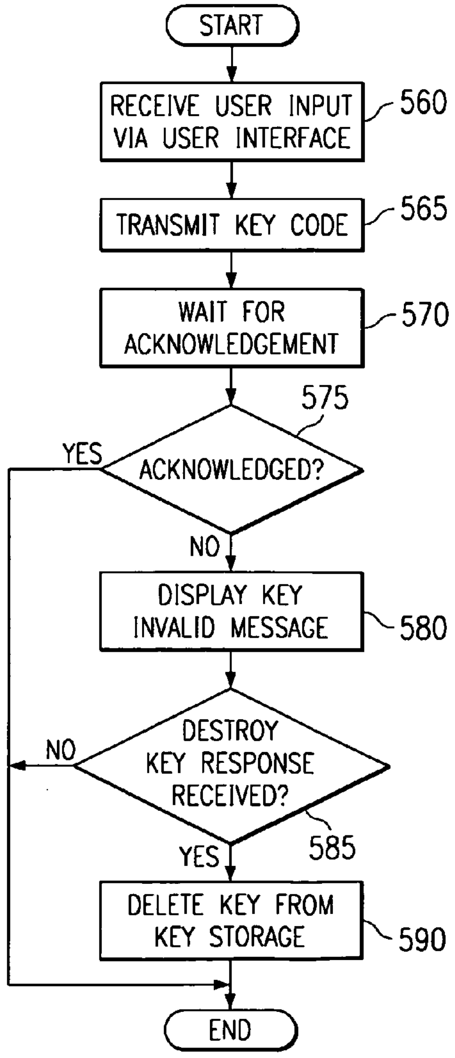
FIG. 5B is a flowchart outlining an exemplary operation of a wireless communication device when attempting to open an electronic locking device in accordance with the present invention.

FIG. 5B is a flowchart outlining an exemplary operation of the wireless communication device when making use of a stored secondary key code. The operation starts with receiving user input via the user interface (step 560). The secondary key code is then transmitted (step 565). The wireless communication device then waits for acknowledgment from the electronic locking device that the secondary key is valid (step 570).

A determination is made as to whether or not the transmitted key was acknowledged (step 575). If so, the operation ends and the electronic locking device is operated. If not, an invalid key message is displayed (step 580). A determination is then made as to whether or not a response from the electronic locking device indicates that the transmitted key should be destroyed (step 585). If not, the operation ends. If so, the key is deleted from the key storage (step 590) and the operation then ends.

Figure 6:
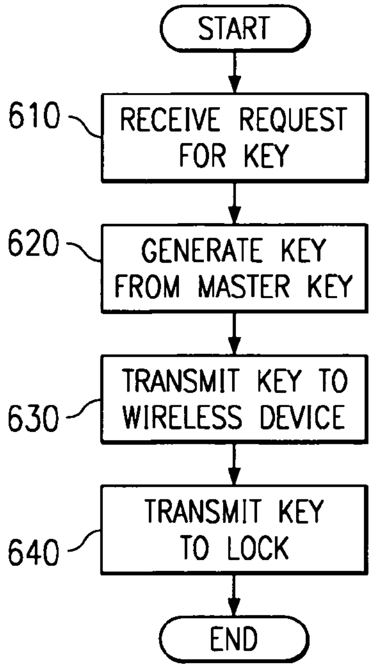
FIG. 6 is a flowchart outlining an exemplary operation of a key supplier when generating an electronic key code for opening an electronic locking device in accordance with the present invention.

FIG. 6 is a flowchart outlining an operation of the key supplier in accordance with the present invention. The operation starts with receiving a request for a secondary key code from a wireless communication device (step 610). A secondary key code is then generated from the master key code (step 620) and transmitted to the wireless communication device (step 630). The secondary key code is also transmitted to the electronic locking device (step 640).

Figure 7:
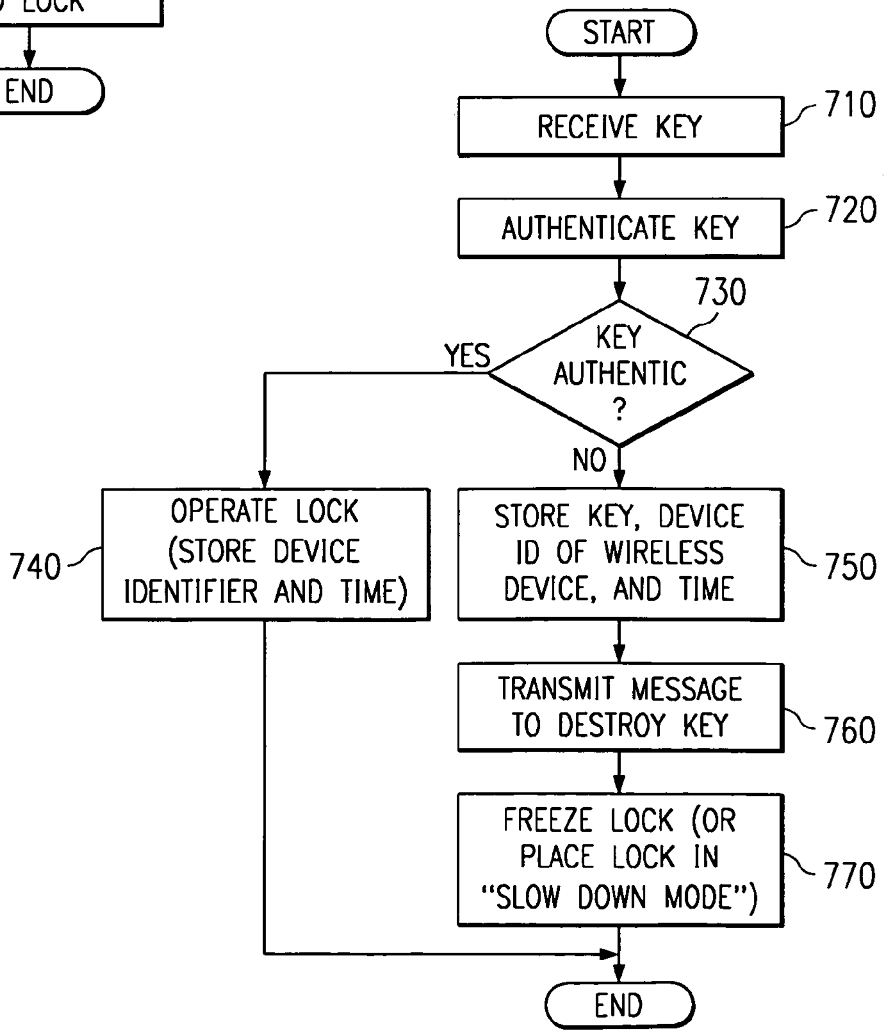
FIG. 7 is a flowchart outlining an exemplary operation of the present invention when authenticating an electronic key code.

FIG. 7 is a flowchart outlining an exemplary operation of the present invention when authenticating a transmitted key code. The operation in FIG. 7 may be performed by either the electronic locking device, the key supplier, or a combination of the two, for example. The operation starts with reception of a transmitted key code (step 710). The transmitted key code is authenticated (step 720) and a determination is made as to whether the key code is authentic (step 730). If the key code is authentic, the electronic locking device is operated (either locked or unlocked) and the wireless communication device identifier and the time may be stored (step 740). If the key code is not authenticated, the transmitted key code, the wireless communication device identifier, and the time information may be stored in a report (step 750). A message may then be transmitted to the wireless communication device to destroy the transmitted key code (step 760). In more extreme cases, the electronic locking device may be placed in "slow down mode" or a frozen state (step 770) requiring retransmission of the master key code before the locking device will again operate. The operation then ends.

Thus, the present invention provides a system, apparatus and method for using an electronic key code to operate electronic locking devices. The present invention overcomes the drawbacks of the known physical key and keycard systems by reducing the likelihood of loss of the "key" as well as reducing the overall cost of reproduction of the key to a negligible amount. In addition, the present invention provides a mechanism that allows for high levels of security by providing multiple sources of authentication as well as the ability of a key supplier to immediately control the use (or non-use) of keys that have been generated.

Figure 8:
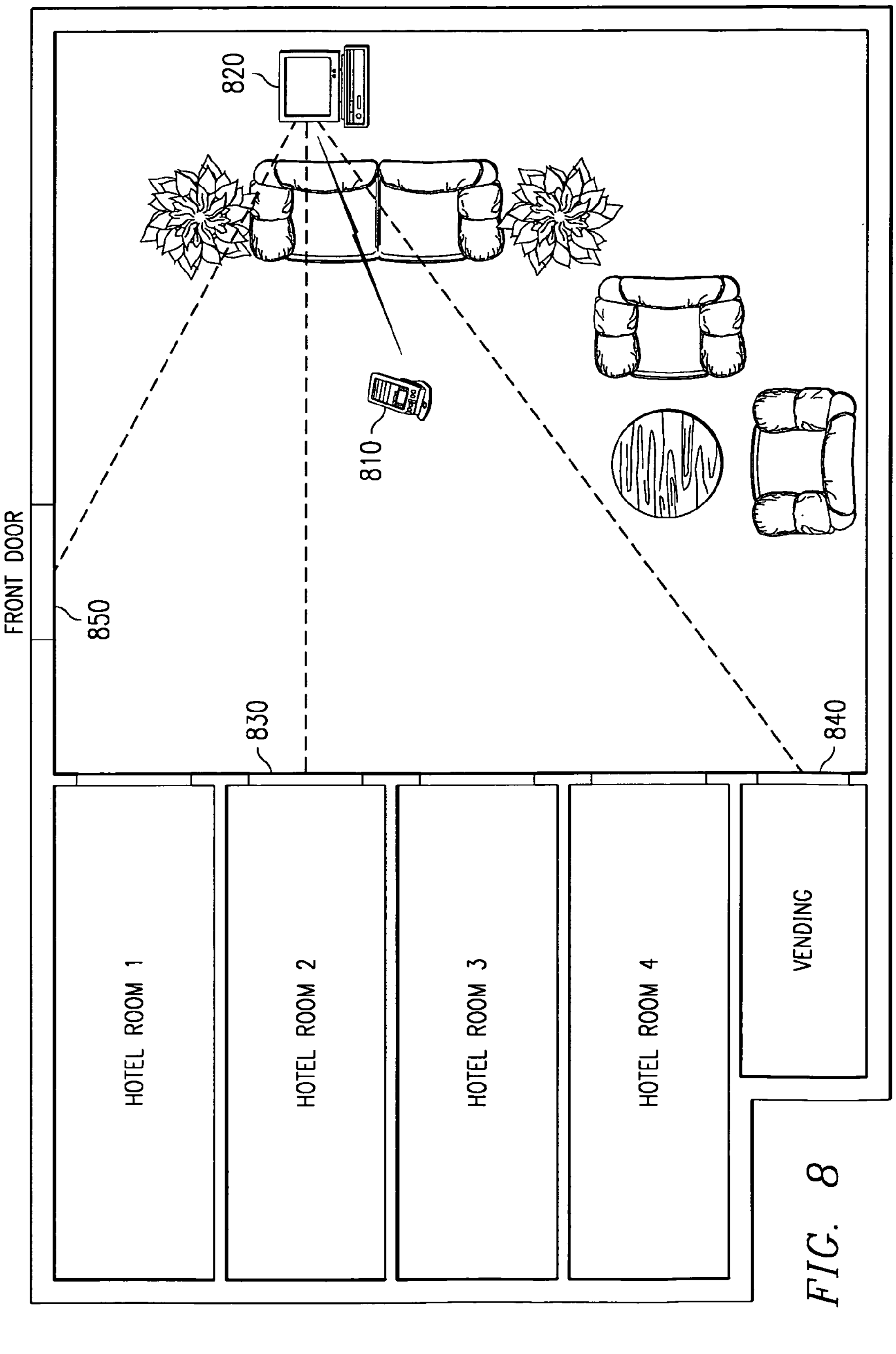
FIG. 8 is an exemplary diagram illustrating a use of the present invention in a hotel environment.

As an example application of one embodiment of the present invention, consider the hotel environment depicted in FIG. 8. As shown in FIG. 8, a customer of the hotel arrives at the hotel desk with his/her personal digital assistant 810. The customer negotiates for rental of a hotel room and sends a secondary key code request from the PDA 810 to the hotel key supplying computer 820.

In response, the hotel computer 820 generates a secondary key code and transmits it to all of the electronic locking devices to which the customer is provided access. This includes the customer's hotel room door lock 830, the vending machine room door lock 840, and the front door lock 850. The secondary key code is also sent to the PDA 810.

The secondary key code may include a master key portion, secondary key portion, device identifier portion an activation/expiration portion, and other portions such as that shown in FIG. 4. For example, the secondary key code may include a master key portion identifying the hotel computer 820 as an authorized key supplier, a secondary key portion used to operate the various locking devices 830–850, a device identifier portion identifying PDA 810 as the authorized device to transmit the secondary key code, and an activation/expiration portion identifying the secondary key codes as being valid for only one night (or however long the customer chooses to rent the hotel room).

In this way, the user of the PDA 810 may gain access to the hotel room, the hotel lobby and the vending machine room simply by transmitting the secondary key code. The various electronic locking devices will perform decryption, if necessary, and authentication of the transmitted secondary key code and will operate only when a valid secondary key code is received. Alternatively, the various electronic locking devices may be passive devices with all authentication being performed by the hotel computer 820. For electronic locking devices having multiple valid secondary key codes, such as the front door locking device 850 and the vending room door locking device 840, a table of valid secondary key codes may be stored in the electronic locking device or in the hotel computer 820, depending on the particular implementation.

Furthermore, the electronic locking devices 830–850 may make reports to the hotel computer 820 of which secondary key codes have been used to operate the electronic locking devices 830–850. Such history information may be stored in the hotel computer 820 for later use in evaluating security breaches, if any.

If an invalid secondary key code is attempted on the electronic locking devices 830–850, a report of the attempt may be sent to the hotel computer 820. If repeated attempts with an invalid secondary key code are made, or if other signs of tampering with the electronic locking device are detected, the electronic locking devices 830–850 may be placed in a "slow down mode" or "frozen" state. In the "frozen" state, the hotel computer 820 is required to retransmit the master key code to the electronic locking devices before they will operate, even if a valid secondary key code is subsequently transmitted to the electronic locking devices.

In this way, third parties that attempt to “pick” the locks by using a mechanism to guess the correct secondary key code may be thwarted.

Secondary key codes may be invalid because they are either not correct or they are being used at a time in which they are designated to be invalid. For example, a key code may be provided with activation/expiration information indicating times at which the key code is valid and times at which the key code is invalid. Thus, for example, a maid may be provided access to hotel rooms on a second floor only during times which correspond to her work shift. Similarly, a maid or other support staff may be provided access to the front door of the hotel only during the times of 9 a.m. to 5 p.m., or the like. In this way, security of the hotel rooms is maintained by allowing access to only to those persons having reason to access the hotel rooms, e.g., the customer and hotel management personnel, at various times.

It is important to note that while the present invention has been described in the context of a fully functioning data processing system, those of ordinary skill in the art will appreciate that the processes of the present invention are capable of being distributed in the form of a computer readable medium of instructions in a variety of forms and that the present invention applies equally regardless of the particular type of signal bearing media actually used to carry out the distribution. Examples of computer readable media include recordable-type media such a floppy disk, a hard disk drive, a RAM, a CD-ROM, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of operating an electronic locking device using a wireless communication device, comprising:

receiving a master key code from a master key supplier;

generating a secondary key code from the master key code;

transmitting the secondary key code to the wireless communication device; and transmitting the secondary key code to the electronic locking device, wherein the secondary key code is used by the wireless communication device to operate the electronic locking device in lieu of by a tangible device.

2. The method of claim 1, wherein the secondary key code includes a secondary key code portion, an activation/expiration portion, a wireless communication device identification portion that identifies the wireless communication device, a time of issue portion, and a time of last use portion.

3. The method of claim 1, wherein the master key code is received via at least one network.

4. The method of claim 1, further comprising:

sending a master key code request to the master key supplier, the master key code request identifying one or more of a key supplier identifier, a product code of the electronic locking device, an electronic certificate, and a password.

5. The method of claim 1, wherein transmitting the secondary key code to the electronic locking device includes transmitting the secondary key code based on a network address of the electronic locking device.

6. The method of claim 1, wherein transmitting the secondary key code to the electronic locking device includes broadcasting the secondary key code along with an identifier of the electronic locking device.

7. The method of claim 1, wherein the wireless communication device is one of a personal digital assistant, a two-way pager, a mobile telephone device, a wireless transmitter, a handheld computer, a laptop computer, and a Bluetooth™enabled device.

8. The method of claim 1, wherein transmitting the secondary key code to the wireless communication device includes transmitting the secondary key code using at least one of a wireless communication link and a wired communication link.

9. The method of claim 1, wherein transmitting the secondary key code to the wireless communication device includes transmitting the secondary key code as an attachment to an electronic mail message.

10. The method of claim 9, wherein the electronic mail message is sent to the wireless communication device at a remote time from use of the secondary key code to operate the electronic locking device.

11. The method of claim 1, further comprising receiving a confirmation message from the electronic locking device confirming reprogramming of the electronic locking device to accept the secondary key code.

12. The method of claim 1, wherein the electronic locking device is preprogrammed to accept the secondary key code.

13. The method of claim 1, wherein transmitting the secondary key code to the electronic locking device is performed at a remote time from transmitting the secondary key code to the wireless communication device.

14. The method of claim 1, wherein the wireless communication device is a wireless communication device owned by a user.

15. The method of claim 2, wherein the secondary key code portion the activation/expiration portion, the wireless communication device identification portion, the time of issue portion, and the time of last use portion are encoded.

16. The method of claim 1, further comprising maintaining a record of secondary key codes used to access the electronic locking device.

17. The method of claim 1, wherein generating a secondary key code from the master key code includes at least one of using a random number generator, using a key code algorithm, and using one of a plurality of key code generator algorithms chosen in a random or pseudo-random manner.

18. The method of claim 3, wherein the at least one network is the Internet.

19. The method of claim 1, further comprising:

polling the electronic locking device; and receiving status information from the electronic locking device in response to polling the electronic locking device.

20. The method of claim 19, wherein the status information includes at least one of a current status of the electronic locking device, a time at which operation of the electronic locking device was last attempted, a key code last used to attempt to operate the electronic locking device, and a wireless communication device identifier of a wireless communication device last used to attempt to operate the electronic locking device.

21. The method of claim 19, further comprising operating the electronic locking device based on the received status information.

22. A method of operating an electronic locking device using a wireless communication device, comprising:
receiving a master key code from a master key supplier;
generating a secondary key code from the master key code;
transmitting the secondary key code to the wireless communication device, wherein the secondary key code is used by the wireless communication device to operate the electronic locking device in lieu of by a tangible device;
receiving a key code from the wireless communication device;
authenticating the key code based on the secondary key code; and
transmitting a command to operate the electronic locking device if the key code is authentic.

23. The method of claim 22, further comprising:
determining if a number of attempts to operate the electronic locking device within a predetermined period of time exceeds a threshold; and
placing the electronic locking device in a safety mode if the number of attempts exceeds the threshold.

24. The method of claim 23, wherein the safety mode is one of a slow down mode and a freeze mode.

25. The method of claim 22, wherein authenticating the key code includes performing a comparison of the key code to information stored in a key code table.

26. The method of claim 25, wherein the key code table includes an entry for the electronic locking device, and wherein the entry includes one or more of a valid secondary key code, activation/expiration information, and wireless communication device identification information.

27. The method of claim 22, wherein authenticating the key code based on the secondary key code includes determining an activation/expiration time of the secondary key code and determining if a current time is within the activation/expiration time.

28. An apparatus for operating an electronic locking device using a wireless communication device, comprising:
means for receiving a master key code from a master key supplier;
means for generating a secondary key code from the master key code;
first means for transmitting the secondary key code to the wireless communication device, wherein the secondary key code is used by the wireless communication device to operate the electronic locking device in lieu of by a tangible device; and
second means for transmitting the secondary key code to the electronic locking device using at least one of a wired communication link and wireless communication link.

29. The apparatus of claim 28, wherein the master key code is received from the master key supplier via at least one network.

30. The apparatus of claim 28, further comprising:
means for sending a master key code request to the master key supplier, the master key code request identifying one or more of a key supplier identifier, a product code of the electronic locking device, an electronic certificate, and a password.

31. The apparatus of claim 28, wherein the second means for transmitting the secondary key code to the electronic locking device includes means for transmitting the secondary key code based on a network address of the electronic locking device.

32. The apparatus of claim 28, wherein the second means for transmitting the secondary key code to the electronic locking device includes means for broadcasting the secondary key code along with an identifier of the electronic locking device.

33. The apparatus of claim 28, wherein the wireless communication device is one of a personal digital assistant, a two-way pager, a mobile telephone device, a wireless transmitter, a handheld computer, a laptop computer, and a Bluetooth™enabled device.

34. The apparatus of claim 28, wherein the first means for transmitting the secondary key code to the wireless communication device includes means for transmitting the secondary key code using at least one of a wireless communication link and a wired communication link.

35. The apparatus of claim 28, wherein the first means for transmitting the secondary key code to the wireless communication device includes means for transmitting the secondary key code as an attachment to an electronic mail message.

36. The apparatus of claim 35, wherein the electronic mail message is sent to the wireless communication device at a remote time from use of the secondary key code to operate the electronic locking device.

37. The apparatus of claim 28, further comprising means for receiving a confirmation message from the electronic locking device confirming reprogramming of the electronic locking device to accept the secondary key code.

38. The apparatus of claim 28, wherein the electronic locking device is preprogrammed to accept the secondary key code.

39. The apparatus of claim 28, wherein the second means for transmitting the secondary key code to the electronic locking device performs the transmission at a remote time from transmitting the secondary key code to the wireless communication device.

40. The apparatus of claim 28, wherein the wireless communication device is a wireless communication device owned by a user.

41. The apparatus of claim 28, further comprising means for maintaining a record of secondary key codes used to access the electronic locking device.

42. The apparatus of claim 28, wherein the means for generating a secondary key code from the master key code includes at least one of using a random number generator, using a key code algorithm, and using one of a plurality of key code generator algorithms chosen in a random or pseudo-random manner.

43. The apparatus of claim 29, wherein the at least one network is the Internet.

44. The apparatus of claim 28, further comprising:
means for polling the electronic locking device; and
means for receiving status information from the electronic locking device in response to polling the electronic locking device.

45. The apparatus of claim 44, wherein the status information includes at least one of a current status of the electronic locking device, a time at which operation of the electronic locking device was last attempted, a key code last used to attempt to operate the electronic locking device, and a wireless communication device identifier of a wireless communication device last used to attempt to operate the electronic locking device.

46. An apparatus for operating an electronic locking device using a wireless communication device, comprising:
means for receiving a master key code from a master key supplier;
means for generating a secondary key code from the master key code; and first means for transmitting the secondary key code to the wireless communication device, wherein the secondary key code is used by the wireless communication device to operate the electronic locking device in lieu of by a tangible device, wherein the secondary key code includes a secondary key code portion an activation/expiration portion, a wireless communication device identification portion that identifies the wireless communication device, a time of issue portion, and a time of last use portion.

47. The apparatus of claim 46, wherein the secondary key code portion and the one or more of a master key code portion, an activation/expiration portion, a wireless communication device identification portion, a time of issue portion, and a time of use portion are encoded.

48. An apparatus for operating an electronic locking device using a wireless communication device, comprising:

means for receiving a master key code from a master key supplier;

means for generating a secondary key code from the master key code;

first means for transmitting the secondary key code to the wireless communication device, wherein the secondary key code is used by the wireless communication device to operate the electronic locking device in lieu of by a tangible device;

means for receiving a key code from the wireless communication device;

means for authenticating the key code based on the secondary key code; and means for transmitting a command to operate the electronic locking device if the key code is authentic.

49. The apparatus of claim 48, further comprising:

means for determining if a number of attempts to operate the electronic locking device within a predetermined period of time exceeds a threshold; and means for placing the electronic locking device in a safety mode if the number of attempts exceeds the threshold.

50. The apparatus of claim 49, wherein the safety mode is one of a slow down mode and a freeze mode.

51. The apparatus of claim 48, wherein the means for authenticating the key code includes means for performing a comparison of the key code to information stored in a key code table.

52. The apparatus of claim 51, wherein the key code table includes an entry for the electronic locking device, and wherein the entry includes one or more of a valid secondary key code, activation/expiration information, and wireless communication device identification information.

53. The apparatus of claim 48, wherein the means for authenticating the key code based on the secondary key code includes determining an activation/expiration time of the secondary key code and determining if a current time is within the activation/expiration time.

54. A computer program product in a computer readable medium for operating an electronic locking device using a wireless communication device, comprising:

first instructions for receiving a master key code from a master key supplier;

second instructions for generating a secondary key code from the master key code; and third instructions for transmitting the secondary key code to the wireless communication device, wherein the secondary key code is transmitted from the wireless communication device to the electronic locking device to operate the electronic locking device.

* * * * *